United States Patent [19]

Hügler

[11] Patent Number: 4,783,050

[45] Date of Patent: Nov. 8, 1988

[54] MAGNETIC VALVE FOR LIQUID AND GASEOUS MEDIA

[75] Inventor: Klaus Hügler, Schorndorf, Fed. Rep. of Germany

[73] Assignee: ASYS GmbH, Schorndorf, Fed. Rep. of Germany

[21] Appl. No.: 63,879

[22] Filed: Jun. 19, 1987

[30] Foreign Application Priority Data

Jun. 21, 1986 [DE] Fed. Rep. of Germany ....... 3620818

[51] Int. Cl.$^4$ .................... F16K 31/06; F16K 11/06; F16K 3/02
[52] U.S. Cl. ......................... 251/129.16; 251/129.05; 137/625.48; 137/625.65
[58] Field of Search ...................... 137/625.65, 625.48; 251/129.16, 65, 129.05

[56] References Cited

U.S. PATENT DOCUMENTS 3,452,780 7/1969 Faustini ................. 251/129.16 X
3,587,650 6/1971 Denker ..................... 137/625.65

FOREIGN PATENT DOCUMENTS 643640 6/1984 Switzerland ................. 137/625.65

Primary Examiner—Arnold Rosenthal
Attorney, Agent, or Firm—Dickstein, Shapiro & Morin

[57] ABSTRACT

A magnetic valve for liquid and gaseous media having a flatbody slide valve which can slide with the aid of electromagnetic force between two planar-parallel slide surfaces. The slide surfaces include control openings. The slide valve comprises a core polarized by at least one stationary permanent magnet with at least one opening in the core being perpendicular to the planar-parallel slide surfaces. A pressure chamber is formed in the core with ends at both sides of the chamber. A cover surface borders an end wall of the chamber. At least two pair of corresponding control openings are inversely disposed. A connection bore having an opening at either end is in fluid communication with the pressure chamber. The edges of the bore openings serve to form control edges for the at least two pairs of control openings.

32 Claims, 2 Drawing Sheets

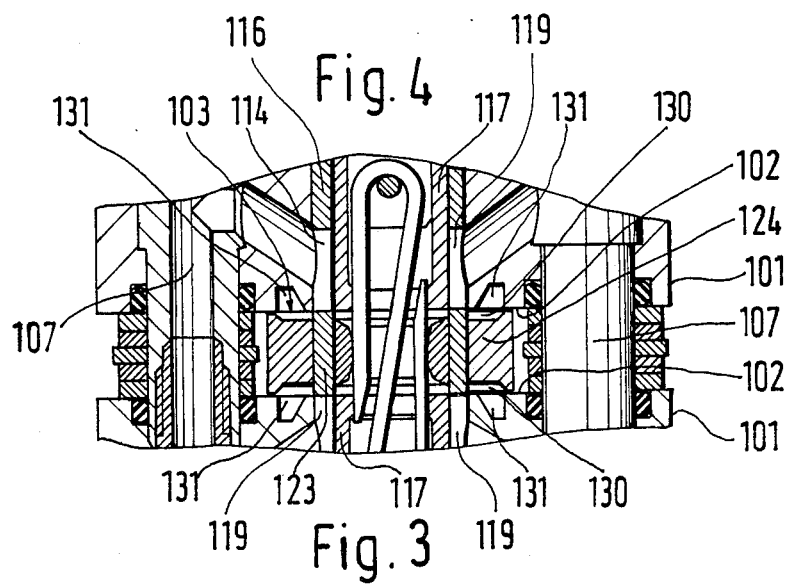
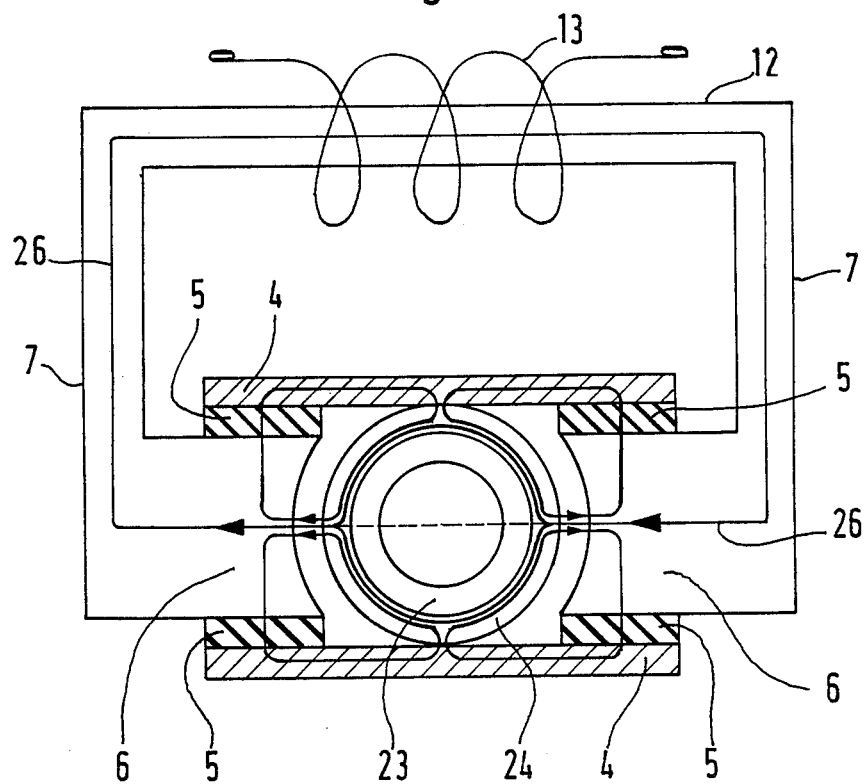

MAGNETIC VALVE FOR LIQUID AND GASEOUS MEDIA

BACKGROUND OF THE INVENTION

The present invention relates to a magnetic valve for liquid and gaseous media.

In attempting to reduce the dimensions of known magnetic valves of this type, one rapidly encounters a limit at which particularly the necessary fine manufacturing tolerances can no longer be maintained. Efforts toward miniaturization were therefore directed towards valves having a control piston. But even in these instances, the minimum dimensions are still relatively large in view of the difficult machining and necessary manufacturing tolerances.

The geometric shape of the core, which is formed as a flat-body slide, permits maintenance of very fine tolerances, even with minimal dimensions. This permits not only a much greater degree of miniaturization of the valve according to the invention; but additionally core can also be manufactured with an extremely low mass, which allows extremely short valve reaction times to be attained.

The magnetic valve according to the invention can be formed as a constant, quasi-constant, monostable, bistable or tristable valve. The valve therefore can be driven with more than just two or three switch positions. Rather, the flat-body slide can also assume any intermediate positions between its end positions as is necessary, for example, for constant and quasi-constant method of operation. Finally, the magnetic valve according to the invention can be formed not only as a three-way valve, but also as a four and five-way valve. Due to the short switch times, the small stroke and the low inertial mass, which are realized with the magnetic valve according to the invention, it is also possible to control the valve by means of a modulation in the frequency and/or the amplitude and/or the mark-to-space ratio of the electrical control signals, so that even a quasi-constant regulation is possible. In a constant and quasi-constant operation, tolerances in the range of a few thousands of a millimeter are necessary with regard to the position of the control edges relative to each other. The resulting expensive grinding of annular grooves required in known valves with elongated piston slides and the expensive inside lapping of bushings can be replaced in the solution according to the invention by the substantially less expensive circular grinding and outside lapping of plates.

It is preferred that the flat-body slide have the shape of a cylindrical pipe, circular both inside and outside. This reduces the mass, as compared to a disc, which is advantageous for small, rapid switch valves. In addition, the inner chamber of the flat-body slide can be used as a connecting channel between the two valve plates, thus substantially simplifying the channel system, which leads to lower costs and to smaller dimensions of the valve. A flat-body slide in the form of a pipe or ring also makes it possible to realize at relatively low expense both an inner and an outer control edge with very high precision with regard to position and spacing. This eliminates dead travel and achieves a strict linearity between movement and degree of opening, which is particularly important for constant valves such as servo-valves.

Advantageously, the flat-body slide consists of at least two coaxial nesting sleeves. The flat-body slide can in this manner better be adapted to different requirements than with a one-piece embodiment.

OBJECTS OF THE INVENTION

It is a primary object of the present invention to create a rapid switching, low friction magnetic valve which makes possible greater miniaturization then has previously been attainable, yet still permits a simple adaptation to various requirements. This and other objects are achieved by the present invention having the following characteristics.

In a preferred embodiment both slide plate surfaces are provided with control openings. In this case both frontal surfaces of the flat-body slide have closure surfaces for these control openings. By this means the friction which the flat-body slide must overcome in order to move can be significantly reduced, because a support can be formed on both sides of the slide by the medium to be controlled. Preferably, in this manner the embodiment and arrangement of the control openings in the two slide plate surfaces is selected in such a manner that equal hydraulic forces result on both frontal sides of the flat-body slide. This complete compensation of hydraulic forces results in minimal friction and, accordingly, minimal wear. Because no soft seals are necessary, but only metallic opening seals are present, opening play can be obtained that is measured in billionths, such as are necessary for a quasi-constant operation, where the flat-body slide performs oscillating movements. The very low mass forces that can be achieved with the flat-body slide valve according to the invention also contribute toward reducing friction to an extremely low value, which is particularly important for constant valves for reasons of hysteresis.

Equal hydraulic forces on both frontal sides of the flat-body slide can be obtained in a simple manner with the use of structurally identical slide plates, which are also advantageous for reasons of manufacturing.

The slide plate surfaces which cooperate with the flat-body slide valve can be formed by the surfaces of plate-like elements. Preferably, however, the two valve plates have bushings which are inserted in support plates and the frontal surfaces thereof form at least a portion of one or the other of the valve plate surfaces. By means of bushings of this type, control openings with extremely high precision can be realized in a very economical manner. In one preferred embodiment therefore, two coaxial cylindrical slotted bushings are provided, which bushings are arranged in a cylindrical bore in one or the other of the valve plates. Each of these slotted bushings preferably have two diametrically opposite, identical slots, which is advantageous for manufacturing reasons.

The inside of the control slots of the slotted bushings are preferably closed by the outer cover surface of a control bushing which is placed in the slotted bushing. The diameter of the bushings which determines the position of the control edges of the control openings in the valve plate surfaces, like the diameter which determines the control edges of the flat-body slide, can, at relatively little expense, be established so precisely that a so-called zero cut can be achieved, i.e. so that there is neither an overlap nor an underlap.

By means of a leg spring which passes through the tubular flat-body slide and engages in the two valve plates, the flat-body slide can be held in a rest position and returned to the rest position after moving there-from. The leg spring, which is preferably formed as a U or Z spring, preferably lies with both its legs against a cylindrical inner surface of the flat-body slide. The flat-body slide thus has the possibility of rotating relative to the leg spring, which is advantageous with respect to providing means for self-adjustment and a reduction in the formation of wear marks.

A precise alignment of the flat-body slide and its rest position with the aid of the leg spring can be achieved in a particularly simple manner by the construction of the flat-body slide and the valve plates of the present invention. If it is not necessary to align the flat-body slide with its rest position, then the leg spring need only be eliminated.

The drive of the flat-body slide can be provided in various ways. For example, it could be accomplished by means of a draw tongue coupling it with the drive device. In one preferred embodiment, however, the flat-body slide is arranged as the core between the pole pieces of the magnetic system. This contributes not only to a minimum of mass having to be moved, but also to space savings, because no additional core is necessary. A direct drive of this type for the element to be moved is of course also advantageous if the element to be moved is not a flat-body slide formed in accordance with the invention.

The flat-body slide could consist entirely of a magnetizable metal. In one preferred embodiment, however, it consists of an inner bushing formed as the closure member which is made from a poor conducting or non-conducting material and an outer bushing formed as the core and magnetic shielding made from a magnetizable material. Particularly in those cases where the inner bushing is permitted to extend beyond the two frontal surfaces of the outer bushing, an excellent sliding behavior is obtained. The sliding surfaces of the inner bushing hereby are kept free of any magnetic field, thus preventing a depositing of ferritic worn-off material on the control edges, thus assuring a good self-cleaning.

For manufacturing reasons it is effective to hold the two slide plate surfaces at the desired distance from each other by spacer elements, since this type of spacer element can be machined together with the flat-body slide. If the valve according to the invention requires a permanent magnet system in addition to an electromagentic system, which can be necessary for automatic stopping purposes in an impulse drive and to achieve a high degree of magnetic effectivenes or a high degree of power density, then these spacer elements are advantageously formed by flux-conducting strips between which the flat-body slide valve is arranged so as to be slidable in the longitudinal direction of the strips. In this manner a simple compensation for the magnetic forces acting on the flat-body slide laterally to its direction of movement can be achieved.

Yet another embodiment of the present invention contributes significantly toward a space-saving design of the valve, because the multiple functions of this type of stop pins substantially reduces space requirements. Stop pins of this type also reduce cost.

BRIEF DESCRIPTION OF THE DRAWINGS

The invention is described in greater detail below with the aid of two exemplary embodiments illustrated in the drawings. Shown are:

FIG. 3 is a schematic illustration of the associated magnetic system and,

FIG. 4 is a portion of a longitudinal section through a second exemplary embodiment.

DETAILED DESCRIPTION OF THE PREFERRED EMBODIMENT

Figures 1, 2:
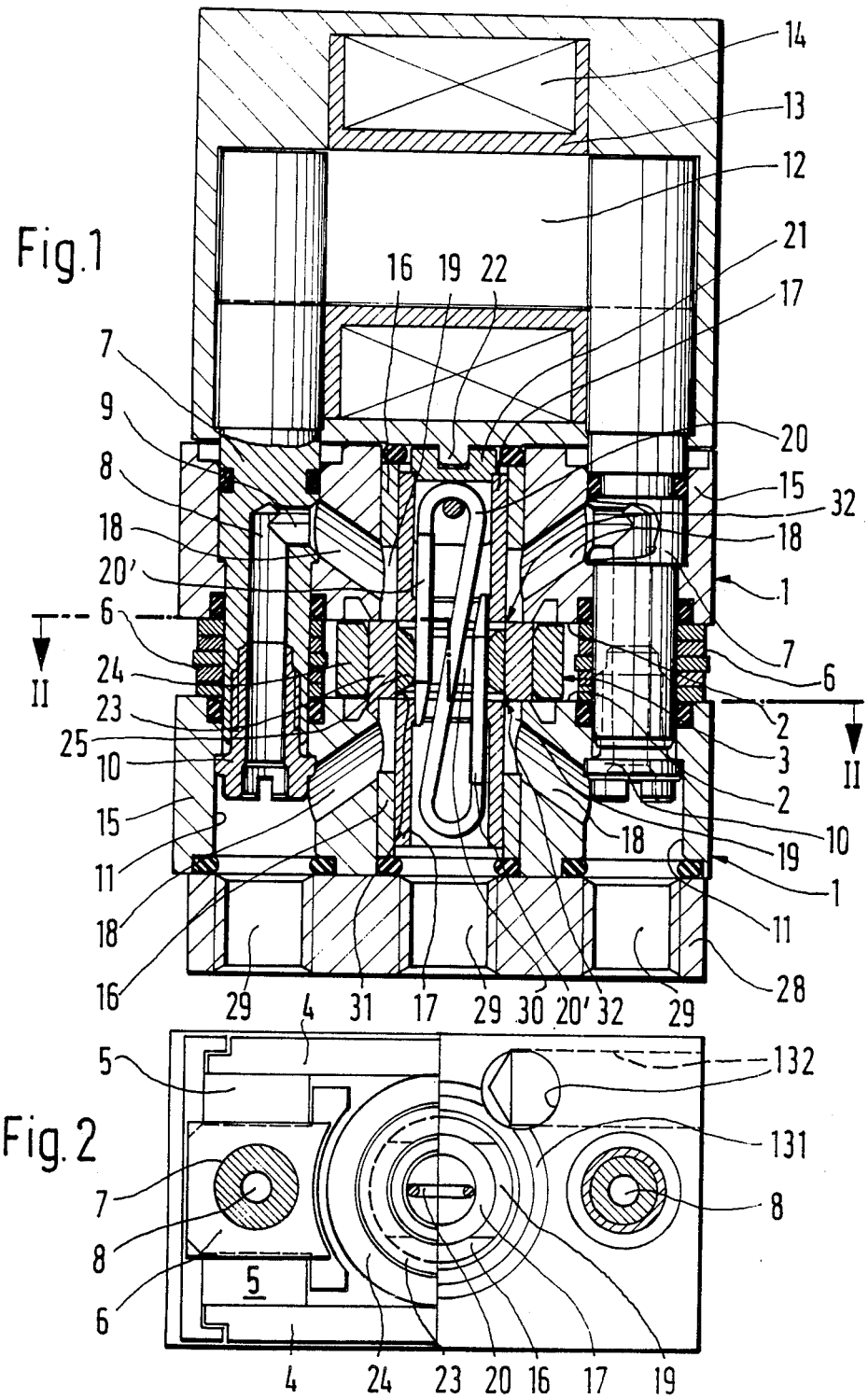
FIG. 1 is a longitudinal section through a first exemplary embodiment.
FIG. 2 is a section along the line II—II in FIG. 1.

A miniature magnetic valve, which can be easily modified to adapt to various requirements, has, as shown in FIGS. 1 and 2, an essentially cubical shape. Two structurally identical metallic valve plates 1 having rectangular outside shapes define by their facing, planar-parallel slide plate surfaces 2 an intermediate chamber, in which is arranged a flat-body slide, designated generally with the numeral 3. The two valve plates 1 are spaced from each other by means of two identical and parallel flux-conducting strips 4 (FIG. 3), adjacent to which are the edge zones of the slide plate surfaces 2 extending in the sliding direction of the flat-body slide 3. In the area of the two end sections of these flux-conducting strips 4, there are provided respective permanent magnets 5 of equal size and strength. The inner sides of these permanent magnets 5, in turn abut two pole pieces 6 formed by stacked sheets, of which the center sheet slightly extends beyond the other sheets toward its opposite pole piece 6 to form a stop for the flat-body slide 3.

The two pole pieces 6 are each passed through respective detent pins 7, which also pass through bores in one valve plate 1 and engage in the through-bores 11 that align therewith in the other valve plate 1. The detent pins 7 are provided with a central blind bore 8, which is adjoined by a bore 9 which extends radially inward. In its free end section the blind bore 8 in the detent pin 7 expands to a threaded bore of greater diameter in which a hollow screw 10 engages. The central bore in this hollow screw 10 has the same diameter as the smooth portion of the blind bore 8. Thus, like the detent pins 7, the two hollow screws 10 rest against a shoulder in the through-bores 11 that receive them in the valve plates 1, and pull the two valve plates 1 together.

A bar-like yoke element 12 made from a highly magnetizable material, which engages in a lateral slot in the detent pins, is connected with the ends of the detent pins 7 opposite the two hollow screws 10. The longitudinal axis of this yoke element 12 lies at a right angle to the longitudinal axis of the detent pins 7. The portion of the yoke element 12 lying between the detent pins 7 supports a spool element 13 having an excitation winding 14, the connections of which are not shown. The excitation winding 13 can also consist of two separate spools.

The two valve plates 1 consist of a support plate 15, which is provided with a central through-bore, a slotted bushing 16 placed in this through-bore, and a control bushing 17 placed in said slotted bushing 16. Aside from the through-bore holding the two bushings, the two valve plates 1 are provided with connection bores 18, which run from the bores 9 and 11, respectively, to the through-bore. In the exemplary embodiment the longitudinal axis of the connection bores 18 intersects the longitudinal axis of the associated through-bore in the connecting opening lying in the valve plate surface 2.

The two identically formed slotted bushings 16 have two diametrically opposite control slots 19, which extend peripherally over an angle of about 90 degrees, are open toward the slide plate surface 2 and from there extend far enough in an axial direction of the slotted bushings 16 that they cover the connecting opening of the connection bore 18 opening into them.

The two identically formed control bushings 17 abut the inner cover surface of the associated slotted bushings 16 without play and close off the inner side of the control slots 19. As with the slotted bushings 16, the frontal surface facing the flat-body slide in the control bushings 17 also aligns with the valve plate surface 2. The end section of the control bushings 17 facing the flat-body slide 3 has a somewhat reduced inside diameter. The thus-formed cylindrical inner contact surface lying coaxially to the longitudinal axis serves as a support surface for the two legs of a bent Z-shaped leg spring 20 made from a round wire, which leg spring 20 penetrates the flat-body slide 13 and penetrates into the two control bushings 17.

The legs of the leg spring 20, which could also have an M-shape, retain their parallel position relative to each other when the spring is compressed or expanded. A thin-walled pipe 20' is pushed over the two legs. These pipes 20'. enlarge the contact surface and provide a simple way to assure the straightness of the legs. In addition, the pipes 20' can consist of a different material than the leg spring, preferably a very hard material, or can also be coated in order to achieve the desired characteristics.

A stop 21 is inserted in the control bushing 17 adjacent the excitation winding 14, which stop has a lateral slot through which a lateral pin passes. One curve of the leg spring 20 lies in this lateral slot, overlapping the lateral pin. This fixes the curve in such a manner that its center aligns with the center of the flat-body slide, and the plane defined by the leg spring 20, in which the two legs move, is aligned with the sliding direction of the flat-body slide 3. A projection 22 on a plate secured between the spool element 13 and the side of the adjacent valve plate 1 engages in a lateral slot in the stop 21 and thereby holds the stop 21 in the correct position.

The flat-body slide 3 has a throttle ring 23 made from a non-magnetizable metal or a metal that conducts magnetism poorly. The axial length of the throttle ring 23 is equal to the thickness of the two flux-conducting strips 4. Therefore, the two planar-parallel frontal surfaces of the throttle ring 23 rest with no play against the adjacent slide plate surfaces 2. The inside diameter of the throttle ring 23, as shown in FIG. 1, is exactly equal to the inside diameter of the two precisely coaxially disposed slotted bushings 16 and to the outside diameter of the control bushings 17, which are also arranged precisely coaxially.

The outside diameter of the throttle ring 23 is enough larger than the outside diameter of the slotted bushings 16, that in each position of the flat-body slide 3, at least one control slot 19 of the two slotted bushings 16 in the valve plate surface 2 is closed.

The throttle ring 23 surrounds a conducting ring 24 made from a metal that is easily magnetized, the outside diameter of which is equal to the spacing of the two flux-conducting strips 4 from each other, so that the flat-body slide 3 lies with practically no play between the two flux-conducting strips 4. At the outside diameter of the conducting ring 24, beyond the two frontal sides of which the throttle ring 23 slightly extends, the curve of the pole surfaces facing the flat-body slide 3 is adapted to the pole pieces 6, as is the stop plate, as shown in FIG. 2. The sliding range of the flat-body slide 3 toward one or the other of the pole pieces 6, which is limited by the stop surface, is selected relative to the radial extension of the control slots 19 in such a manner that these control slots 19 can be opened by the flat-body slide 3.

A spacing ring 25 is placed in the throttle ring 23, which is why in the exemplary embodiment the recessed area 30 formed by the inner chamber is not completely bordered by the throttle ring 23, but rather the portions of the end areas of the cover surface 31 of the recessed area 30 that border the frontal sides are formed by the throttle ring 23, but are otherwise formed by the spacing ring, the inside diameter of which is equal to the diameter of the annular collar or shoulder surfaces of the two control bushings 17. By this means the leg spring 20 is able to align the flat-body slide 3 precisely with the position in which the two inner control edges of the throttle ring 23 with zero cut are aligned with the control edges forming the two control bushings 17. Because a portion of the medium to be controlled must flow through the inner chamber of the flat-body slide 3, the spacing ring 25 ends at a distance from the two valve plate surfaces 2, and in addition, the two end sections of the passage channel formed by the spacing ring 25 form respective rounded entrances.

As shown in FIG. 3, the magnetic flux produced by the excitation winding 14 and indicated by a line 26 flows from the yoke element 12 through one detent pin 7 to a pole piece 6. From there it passes into the conducting ring 24, where it is uniformly distributed. The magnetic flux then passes into the other pole piece 6 and closes from there through the other detent pin 7. As FIG. 3 further illustrates, the four permanent magnets 5 are poled in such a manner that their flux flows through one or the other of the flux conducting strips 4 to the point at which the conducting ring 24 abuts the flux conducting strips 4. As the associated flux lines indicate, the two flux patterns then leave the flux conducting strips 4 and pass into the conducting ring 24, where they again are distributed. In the area facing the pole pieces 6, they then pass into the pole pieces and in this manner close once again. By means of this completely symmetrical course of the magnetix flux lines produced by the permanent magnets 5, the magnetic forces acting on the flat-body slide valve 3 laterally to its direction of movement are completely compensated. The permanent magnets 5 therefore assure that the flat-body slide 3 can be held selectively in abutment against one or the other of the pole pieces 6, or more precisely, against the stop plate thereof. The impulse-like excitation of the excitation winding 14 can release the flat-body slide 3 from this position, so that the leg spring 20 can align it in the center position. Of course, it is also possible to move the flat-body slide 3 from one end position to the other by means of a single impulse.

A connector plate 28, which is provided with connection bores 29 for the connection leads, adjoins the surface facing away from the flat-body slide 3 of the valve plate 1 that does not border the end spool element. The connection bores 29 are aligned with the two passage bores 11 and with the inner chamber of the adjacent control bushing 17 or the pressure chamber 30. If, for example, a pressure-producing device is connected to one of the two outer connection bores 29 and a consuming device is connected to the center connection bore 29, then if the other outer connection bore 29 serves to reduce pressure, the valve can be operated as a three-way valve and can also act as a constant or quasi-constant valve. In the latter case it is possible to feed the excitation winding 10 with a series of pulses, the frequency and/or amlitude and/or mark-to-space ratio of which can be changed.

As shown in FIG. 4, there need be only a slight change in the exemplary embodiment of FIGS. 1 through 3, in order to obtain a four-way or five-way valve. For a valve of this type the conducting ring 24 is replaced by a conducting ring 124, which, as shown in FIG. 4, has a somewhat smaller inside diameter than the conducting ring 24 and is also provided on both frontal sides with a depression 130 beginning at a small distance from the outside edge, which depression 130 extends to the inside throttle ring 123. In the center position of the flat-body slide 103, the two depressions 130 communicate with control openings 131 in the two valve plate surfaces 102, which in turn are connected to connection bores 132 which are provided in the two valve plates 101 and open to an outside surface. A conection bore 132 of this type is illustrated in FIG. 2. On both frontal sides of the throttle ring 123, both the inner edge and the outer edge thereof form respective control edges. Because the inside diameter of the throttle ring 123 is equal to that of the control bushing 116 and the outside diameters are also equal, a zero cut results in the center position of the flat-body slide 103. The control slots 119 of the slotted bushings 116 have circular, concentric slot edges, which provides a strict linearity between and degree of opening the the distance the flat-body slide moves. Due to the diametrically opposite positions of the control slots 119 of both slotted bushings 116, there results an opposite-type method of operation, i.e. one control slot is opened to the same degree that the other is closed.

For operation as a four-way valve or five-way valve the pressure producing device is connected to the connection communicating with the interior of the control bushings 117 and the consuming device is connected to the two connections aligned with the detent pins 107. The connection bores 131 then serve to transfer the fluid.

In other respects the exemplary embodiment according to FIG. 4 is formed in the same manner as that according to FIGS. 1 through 3, and reference is therefore made to the description of the first exemplary embodiment for further details.

All characteristics mentioned in the above specification as well as those that can be obtained only from the drawings represent components of the invention as further embodiments, even if they are not particularly emphasized or particularly mentioned in the claims.

I claim:

1. Magnetic valve for liquid and gaseous media having a flat-body slide valve which can slide with the aid of electromagnetic forces between two planar-parallel slide surfaces which include slide surface control openings, said flat-body slide valve comprising a core polarized by at least one stationary permanent magnet; at least one opening in said core perpendicular to said planar-parallel slide surface; a pressure chamber formed in said core and having an end wall at both sides thereof; a cover surface bordering an end wall of said pressure chamber; at least two pairs of inversely corresponding control openings; and at least one connection bore having an opening at either end thereof and in fluid communication with said pressure chamber, the edges of said connection bore openings serving to form control edges for said at least two pairs of control openings.

2. Magnetic valve according to claim 1, wherein the slide (3;103) has the shape of a tubular flat-body slide.

3. Magnetic valve according to claim 1, wherein the slide (3;103) further includes several elements, one of which is a tubular throttle ring (23;123), the planar surfaces of which are the sliding surfaces for the slide.

4. Magnetic valve according to claim 1, wherein both sliding surfaces (2;102) are provided with slide surface control openings and both frontal surfaces of the flat-body slide (3;103) have closure paths for these control openings.

5. Magnetic valve according to claim 4, wherein each frontal surface of the flat-body slide (3;103) is capable of closing at least two control openings (19) which correspond to each other in an inverse manner.

6. Magnetic valve according to claim 5, wherein the control opening so (19) in the two slide surfaces (2; 102) provide equal hydraulic forces on the two frontal sides of the flat-body slide (3; 103).

7. Magnetic valve according to claim 6, wherein both of the valve plates (1; 101) are structurally identical.

8. Magnetic valve according to claim 1, further including two valve plates (1; 101) having bushings (16,17) which are inserted in support plates (15) and at least partially form one or the other of the slide surfaces (2;102) with one of their frontal surfaces.

9. Magnetic valve according to claim 2, wherein the tubular flat-body slide (3;103) has four edges, all of which form control edges.

10. Magnetic valve according to claim 4, wherein the axial length of the tubular flat-body slide (3;103) is equal to the height of spacing elements (4) that hold the two valve plate surfaces (2; 102) in planar-parallel positions.

11. Magnetic valve according to claim 4, further including two cylindrical slotted bushings (16) arranged coaxially in respective cylindrical bores in one of the other of the valve plates (1; 101), one frontal surface of which aligns in a planar-parallel manner with the slide surface (2; 102) of the valve plate of which it is a part and having a wall with at least one slot (19) open toward the frontal surface that aligns with the slide surface to form a control opening into which respective connecting channels (18) open.

12. Magnetic valve according to claim 11, wherein the inside diameter of the slotted bushings (16) is equal to the diameter of recessed area edges (32) of the flat-body slide (3; 103).

13. Magnetic valve according to claim 11, wherein the inside diameter of the slotted bushings (16) is equal to the diameter of recessed area edges (32) of the flat-body slide (3;103).

14. Magnetic valve according to claim 11, further including a tubular throttle ring having an outer control edge and wherein the outside diameter of the slotted bushings (16) is equal to the diameter the outer control edge of the tubular throttle ring (23; 123).

15. Magnetic valve according to claim 12, wherein the control slots (19) of each slotted bushing (16) are closed on the inside by the outer cover surface of a control bushing (17; 117) inserted in the slotted bushing, which control bushing (17; 117) has a frontal surface which aligns with the associated valve plate surface (2;102) and has an outside diameter which is equal to the diameter of recessed area edges (32) of the flat-body slide (3; 103).

16. Magnetic valve according to claim 2, further including a leg spring (20) which passes through the tubular flat-body slide (3; 103) and engages in the two valve plates (1; 101), the two legs of which spring rest against diametrically opposite points on the flat-body slide (3; 103) and are supported against the two valve plates (1; 101).

17. Magnetic valve according to claim 16, wherein the leg spring (20) is in the shape of one of a Z and an M.

18. Magnetic valve according to claim 16, wherein the legs are each disposed in a sleeve.

19. Magnetic valve according to claim 16, wherein the parallel legs of the leg spring (20) are supported on the valve plate (1; 101) by means of an inner cover surface of at least one control bushing (17), which surface is concentric to the cylindrical support surface of the flat-body slide (3; 103).

20. Magnetic valve according to claim 19, wherein the cylindrical opening in the flat-body slide (3; 103) has the same inside diameter in the area of the contact locations of the control bushings (17) for the leg spring (20).

21. Magnetic valve according to claim 1, having a preferably tubular flat-body slide, wherein the flat-body slide (3; 103) is arranged as core between the pole piece (6) of a magnetic system which is polarized by at least one permanent magnet.

22. Magnetic valve according to claim 1, wherein the control edges of both frontal surfaces of the flat-body slide (103) cooperate with two control slots (119) which preferably operate inversely to each other.

23. Magnetic valve according to claim 22, wherein he control edges of both frontal surfaces of the flat-body slide (103) cooperate with two control slots (119) which preferably operate inversely to each other.

24. Magnetic valve according to claim 23, wherein the control slots (119) have circular concentric slot edges.

25. Magnetic valve according to claim 21, wherein the flat-body slide (3; 103) has throttle ring (23; 123) made from one of a poor magnetic conducting material and a non-conducting material and has a surrounding conducting element (24; 124) made from a material that is easily magnetized.

26. Magnetic valve according to claim 25, wherein the throttle ring (23; 123) projects beyond the two frontal surfaces of the conducting element (24; 124) that surrounds it.

27. Magnetic valve according to claim 19, wherein the flat-body slide (3; 103) is arranged between two parallel flux-conducting strips (4), the spacing of which from each other is adapted to the outside dimensions of the flat-body slide (3; 103) and the end sections of which are conductively connected with the pole pieces (6) by means of permanent magnets (5).

28. Magnetic valve according to claim 27, wherein the flux-conducting strips (4) are formed by the spacing elements holding the valve plate surfaces (2; 102) in parallel planes.

29. Magnetic valve according to claim 19, further including two detent pins (7) which connect the two valve plate (1; 102) with each other, form magnetically conductive legs from the two pole pieces (6) to a yoke (12) supporting at least one magnetic spool (14) and are provided with longitudinal bores (8) which communicate on one side with a connection (29) and on the other side with a channel (18) in the valve plate (1; 101) which is completely penetrated thereby.

30. Magnetic valve according to claim 29, wherein the pole pieces (6) are comprised of several overlapping sheets, one of which projects beyond the other sheets as a stop sheet on the side facing the flat-body slide (3;103).

31. Magnetic valve according to claim 2, wherein the flat-body slide is comprised of laminated layers of different materials.

32. Magnetic valve according to claim 27, wherein the flux-conducting strips (4) and permanent magnets (5) are made from a three-pole permanent magnet formed in one piece.

* * * * *